Figure 1:
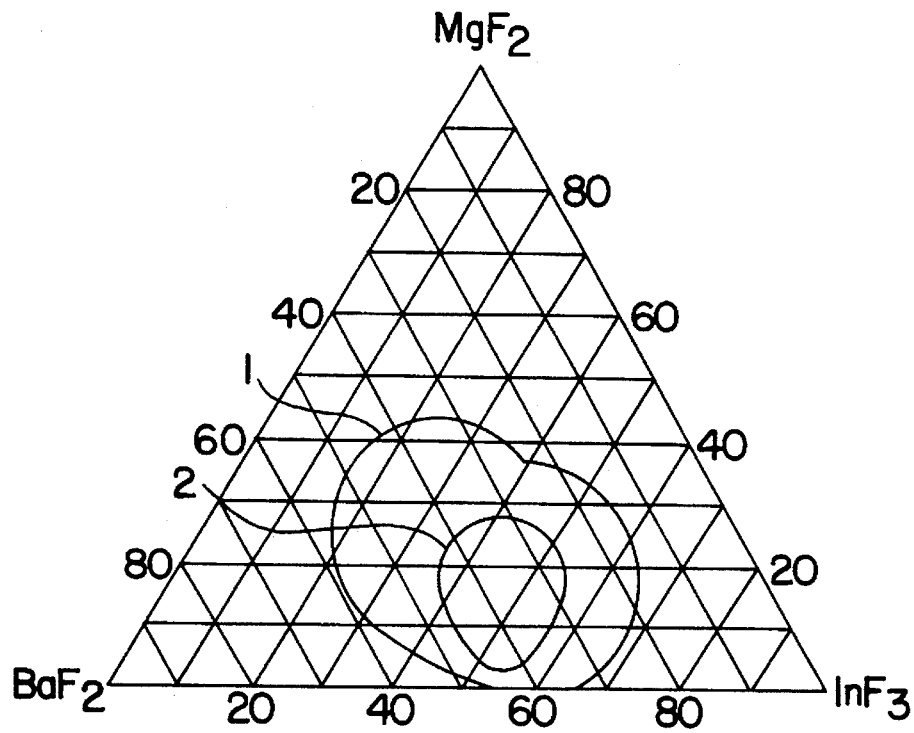

United States Patent

Maze et al.

[11] Patent Number: 5,480,845
[45] Date of Patent: Jan. 2, 1996

[54] FLUORINATED GLASSES

[75] Inventors: Gwendael Maze, Saint Erblon; Marcel Poulain, Rennes; Jean-Yves Carre, Saint Erblon, all of France; Abdelouhed Soufiane, Casablanca; Younes Messaddeq, Kenitra, both of Morocco

[73] Assignee: Le Verre Fluore SA, France

[21] Appl. No.: 425,214

[22] PCT Filed: Mar. 19, 1993

[86] PCT No.: PCT/FR93/00283

§ 371 Date: Jan. 24, 1994

§ 102(e) Date: Jan. 24, 1994

[87] PCT Pub. No.: WO93/19014

PCT Pub. Date: Sep. 30, 1993

Related U.S. Application Data

[63] Continuation of Ser. No. 146,153, Jan. 24, 1994, abandoned.

[30] Foreign Application Priority Data

Mar. 20, 1992 [FR] France ................ 92 03568

[51] Int. Cl.⁶ ................ C03C 3/32; C03C 13/04
[52] U.S. Cl. ................ 501/40; 501/37
[58] Field of Search ................ 501/37, 40

[56] References Cited

U.S. PATENT DOCUMENTS

| | | | |
|---|---|---|---|
| 2,511,224 | 6/1950 | Sun et al. | 501/40 |
| 4,308,066 | 12/1981 | Mitachi et al. | 501/37 |
| 4,346,176 | 8/1982 | Kanamori et al. | 501/37 |
| 4,380,588 | 4/1983 | Mitachi et al. | 501/37 |
| 4,537,864 | 8/1985 | Tick | 501/30 |
| 4,647,545 | 3/1987 | Lucas et al. | 501/30 |
| 4,717,691 | 1/1988 | Lucas et al. | 501/40 |
| 4,749,666 | 6/1988 | Lucas et al. | 501/40 |
| 5,015,281 | 5/1991 | Hall et al. | 65/32.5 |

FOREIGN PATENT DOCUMENTS

| | | | |
|---|---|---|---|
| 0036373 | 9/1981 | European Pat. Off. | 501/40 |
| 0034045 | 2/1982 | Japan | 501/37 |
| 0155549 | 8/1985 | Japan | 501/40 |
| 1058833 | 3/1986 | Japan | 501/40 |

OTHER PUBLICATIONS

*Chem. Abstracts* vol. 104 No. 12 Ab. No. 94043g Nishii et al. Aug. 1985.

Primary Examiner—Mark L. Bell
Assistant Examiner—David Sample
Attorney, Agent, or Firm—Laff, Whitesel, Conte & Saret, Ltd.

[57] ABSTRACT

Flourinated glasses containing indium fluoride and $MF_2$ fluorides in at least 70 moles %, in which M denotes one or several elements of the group Ba, Sr, Ca, Pb. Said glasses contains, in the form of stabilizing elements, either 2 to 12 % gadolinium fluoride, or 2 to 10 % magnesium fluoride, or else a mixture of both fluorides in a proportion not exceeding 20 mole %. Variants of these compositions are also described.

7 Claims, 2 Drawing Sheets

FLUORINATED GLASSES

This application is a continuation 08/146,153 filed Jan. 24, 1994 now abandoned.

This invention concerns fluorinated glasses which can be used in optics, in particular in the infrared band, and which can be used in the manufacture of optical fibers.

Numerous studies have emphasized the interest in glasses made of heavy metal fluorides for optical transmission of up to 7 micrometers and especially the transmission by optical fibers. Further details can be found in the following specialized reference works: "Fluoride Glasses", edited by Alan Comyns, published by John Wiley & Sons in 1989, and "Fluoride Glass Fiber Optics", edited by Ishwar Aggarwal and Grant Lu, published by Academic Press in 1991.

Among the major applications of fluorinated glasses is the transmission by optical fibers in technical fields such as, for example, telecommunications, optical fiber sensors, infrared instruments and medical uses, in particular, laser surgery. In all of these applications, conventional fluorinated glasses which belong to the fluorozirconate family or fluoroaluminate family are restricted to about 4 micrometers in infrared transmission.

For this reason, attempts have been made to produce fluorinated glasses which are transparent in a wider spectral range. Standard compositions, which enable the value of the maximum transmissible wavelength to be increased, are known. Light, small and highly charged cations, for example $Li^+$, $Ti^{4+}$, $Zr^{4+}$, $Nb^{3+}$, $Al^{3+}$ must be excluded. This condition is realized in several families of fluorinated glasses, such as those based on scandium, thorium, gallium and indium fluorides. In particular, Fluoroindate glasses appear promising since they display the least amount of phonon energy. Fluoroindate glasses are mentioned in FR-A-2 478 618 and EP-A-O 036 373. Numerous studies have since been carried out; reference is made, in particular, to the article "Fluoroindate Glasses" by M. Poulain, M. Poulain [sic], Y. Messadeq and A. Soufiane, published in the book "Solid State Optical Materials" in tile series "Ceramic Transactions" of the American Ceramic Society, 1992.

The simplest fluoroindate glasses are binary compositions, such as $InF_3$—$BaF_2$. Since increasing the number of constituents is one of the conventional ways of stabilizing glasses, the compositions used as a base in manufacturing solid samples most often combine $InF_3$ with various divalent fluorides such as $BaF_2$, $PbF_2$, $SrF_2$, $CdF_2$, $CaF_2$, $ZnF_2$. It was also observed that yttrium fluoride stabilized $InF3$-$BaF_2$, that lanthanum fluoride can be incorporated in a limited quantity and that fluorogallate glasses were usually miscible with fluoroindate glasses. Finally, thorium fluoride, whose vitrifying properties are well known, also makes it possible to increase the stability of fluoroindate glasses and decrease the quantity of indium fluoride required to obtain proper vitrification.

Thus, fluoroindate glasses having increased stability are known and their compositions are as follows:

| | |
|---|---|
| BIZYbT | 30 $InF_3$, 10 $ThF_4$, 20 $ZnF_2$, 30 $BaF_2$, 10 $YbF_3$ |
| IZBS | 40 $InF_3$, 20 $ZnF_2$, 20 $BaF_2$, 20 $SrF_2$ |
| PZIGL | 17 $InF_3$, 19 $ZnF_2$, 43 $PbF_2$, 17 $GaF_3$, 4 $LaF_3$ |

Adjustments in the composition of the first two glasses, BIZYbT and IZBS, were made, in particular, by replacing $InF_3$ by $GaF_3$, $YbF_3$ by $YF_3$ or $LuF_3$, $ThF_4$ by $ZrF_4$ or $HfF_4$, $ZnF_2$ by $MnF_2$, $BaF_2$ by $PbF_2$, and $SrF_2$ by $CdF_2$. These experiments, which have been described in the literature, have enabled one to obtain solid samples which are approximately one centimeter thick. However, satisfactory optical fibers cannot be derived from these samples. Various laboratories have demonstrated the occurrence of superficial devitrification leading to numerous mechanical and optical defects. Moreover, certain compositions deemed to be favourable contain a considerable amount of thorium. As thorium is naturally radioactive, certain precautions are required when using it; "this is easily done in a laboratory setting but difficult to envisage in an industrial environment.

An object of the present invention is to provide compositions of Fluoroindate glasses which result in less devitrification than those fluoroindate compositions currently known.

According to one feature of the invention, it is provided that the fluorinated glass compositions contain at least 70% by weight of indium and zinc fluorides and $MF_2$ fluorides, where M is one or more elements of The group Ba, Sr, Ca, Pb, characterized therein that they contain in addition, as stabilizing elements, 2 to 12% gadolinium fluoride, 2 to 0% magnesium fluoride, or a mixture of these two fluorides in a proportion not exceeding 20% by weight.

According to a further feature, the fluoroindate glass is stabilized by an addition of tin fluoride and/or antimony fluoride in a proportion not exceeding 8% by weight.

According to another feature, the fluorinated glass is obtained by partially replacing indium by gallium, or zinc by manganese, in a proportion not exceeding 20% by weight. These two substitutions can be carried out independent of, or in association with, one another.

The gallium contributing to the slight increase in phonon energy must, preferably, be avoided when maximum infrared transmission is sought at increased wavelengths. Manganese can be substituted for zinc since the Fluorides of these two elements often exhibit similar vitrification levels. This substitution can then lead to a supplementary stabilization of the glass, but it can also result in a deterioration of the transmission in the near ultraviolet range and the vitreous samples then appear yellowish.

According to a further feature, the molecular composition of the Fluoroindate glass falls within the following parameters:

2 to 12% of $GdF_3$ 25 to 45% of $InF_3$+$GaF_3$ 15 to 35% of $ZnF_2$+$MnF_2$ 25 to 45% of $BaF_2$+$SrF_2$+$PbF_2$ 0 to 15% of $CaF_2$+$CdF_2$ 0 to 15% of $YF_3$ or yttric rare earths 0 to 12% of a fluoride belonging to the alkaline fluoride group, $LaF_3$ and cerium rare earths, $AlF_3$, $ZrF_4$, $HfF_4$; $ThF_4$.

As in experiments described in the prior art, this invention confirmed that zinc fluoride can be used to a great extent to replace indium trifluoride without significantly changing its vitreous properties. Although there is normally an optimum relationship between the relative concentrations of zinc and indium, it is the cumulative concentration of indium and zinc which appears to play a predominant role in the stability of the final glass.

Within the scope of the above-defined composition, according to the invention, it is understood that the sum of $InF_3$+$ZnF_2$ cannot be less than 45%, that the concentration of $GaF_3$ and of $MnF_2$ cannot exceed 20% and that, in the group $BaF_2$+$SrF_2$+. $PbF_2$, one or two concentrations can be zero. Thus, the stable glasses can be free from lead or strontium. However, as already noted, increasing the number of constituents has proven to be rather flavourable to vitrification. To better understand the description, it is noted that the yttric rare earths include, in addition to yttrium, the following elements: Lu, Yb, Er, Ho, Tm, Dy and Tb, and that the cerium rare earths include: Ce, Pr, Nd and Sm.

In another embodiment of the glasses of the invention, magnesium fluoride was used as a stabilizer for the fluoroindate glasses. A particularly illustrative example is provided by the existence of ternary glasses in the system $InF_3$—$BaF_2$—$MgF_2$ which can be poured to a thickness of more than 2 mm. The ternary diagram in FIG. 1 more precisely shows the limits of the corresponding vitreous zone, line 1 defines the actual vitrification zone, and line 2 indicates the more stable glasses obtained there. In practice, however, this combination does not have sufficient stability to produce components or optical fibers. The number of constituents was thus increased to obtain a vitreous material having adequate properties.

According to another feature, the molecular composition of the Fluorinated glass falls within the following parameters:

2 to 10% of $MgF_2$ 25 to 45% of $InF_3+GaF_3$ 15 to 35% of $ZnF_2+MnF_2$ 25 to 45% of $BaF_2+SrF_2+PbF_2$ 0 to 15% of $CaF_2+CdF_2$ 0 to 15% of $YF_3$ or yttric rare earths 0 to 12% of a fluoride belonging to the alkaline fluoride group, $LaF_3$ and cerium rare earths, $AlF_3$, $ZrF_4$, $HfF_4$; $ThF_4$.

According to a further feature, the fluorinated glass contains both magnesium and gadolinium as stabilizing elements, in an overall proportion of between 2 and 20% by weight, while the remaining constituents are present in the same ratios as above.

According to another feature, the fluorinated glass contains:

2 to 6% of $GdF_3$ 38 to 42% of $InF_3+GaF_3$ 15 to 25% of $SrF_2+PbF_2+CaF_2$ 15 to 25% of $BaF_2+CdF_2+LaF_3$ 18 to 22% of $ZnF_2+MnF_2$ 0 to 8% of alkaline fluoride, yttric rare earth or $M'F_4$ fluoride, where M'=Zr, Hf, Th.

It will be noted that magnesium, a light element, is less advantageous than indium for infrared transmission because it tends to shift the multiphonon absorption limit toward lower wavelengths. Moreover, magnesium tends to increase the resistance of the glass to corrosion due to humidity and also to increase its mechanical resistance.

The same is true for lithium which is part of the list of additives which can be incorporated to a maximum of 12% by weight. However, since this is a monovalent or divalent cation, the contribution of these cations to the multiphonon absorption limit becomes proportionately less as the wavelength diminishes. In other words, the reduction of infrared transparency associated with the introduction of magnesium of lithium into the glass composition can be less significant between 5 and 6 micrometers than for lengths of about 8 micrometers.

These glasses are synthesized according to the conventional method for fluorinated glasses: anhydrous fluorides are mixed, fused, homogenized, poured, cooled and annealed. These operations are conducted in such a way that contamination induced by water vapour or reactive chemical agents is negligible, whereby the tolerable contamination threshold is, of course, dependent on the intended application.

Figure 2:
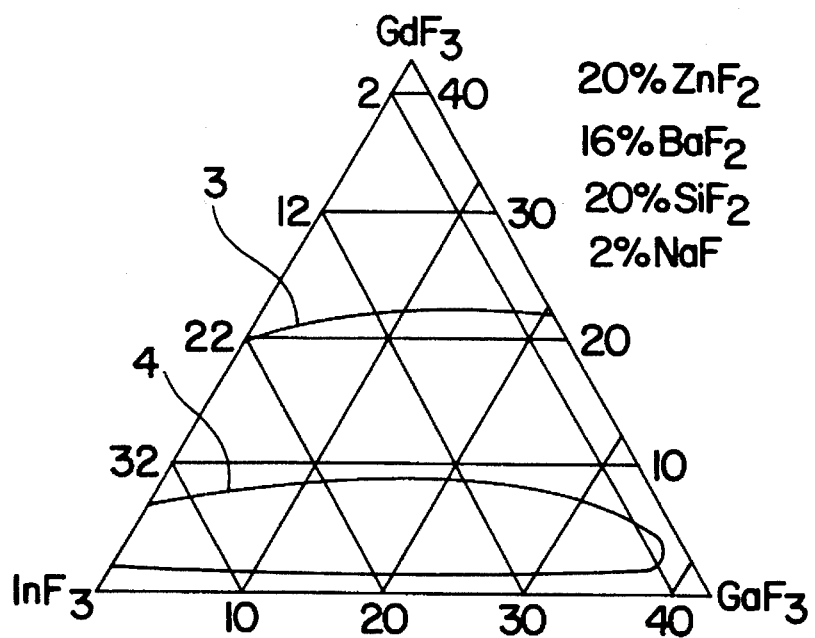
Figure 3:
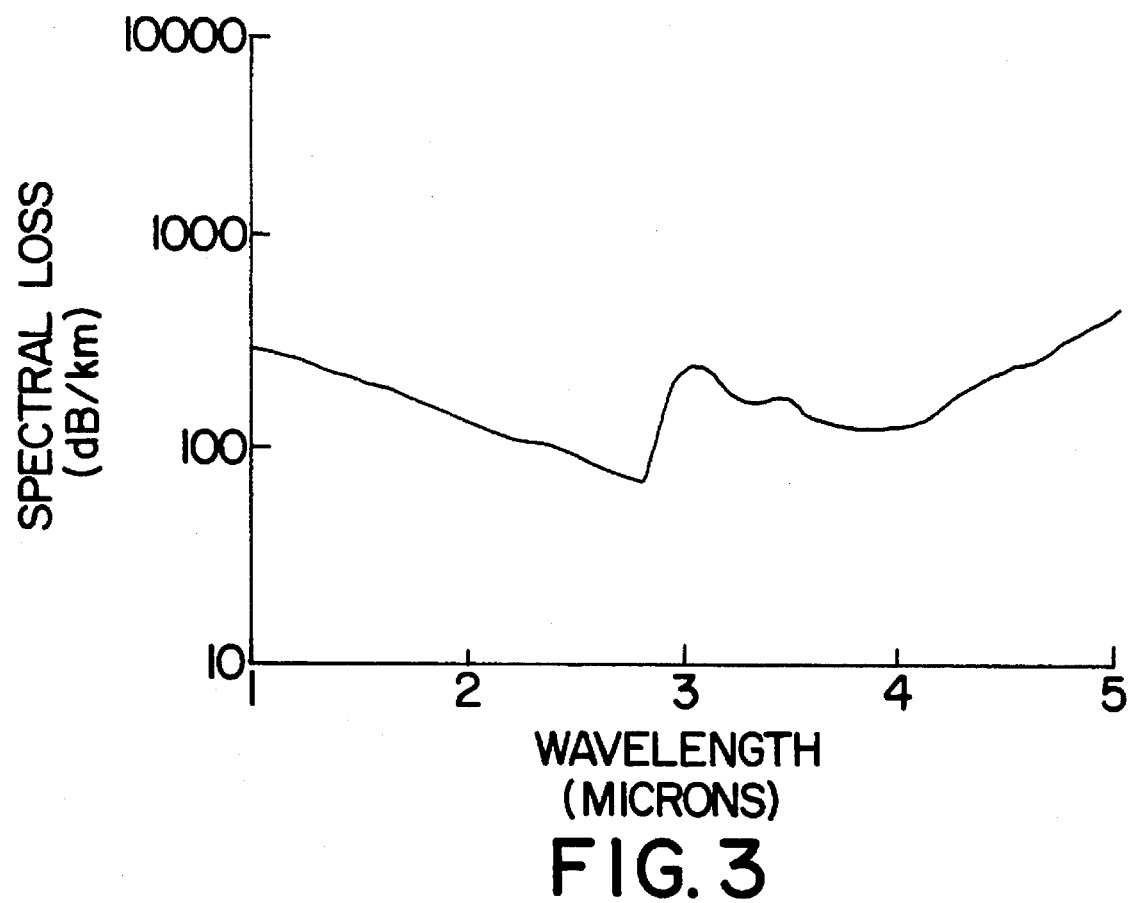

The aforementioned features of the invention will be better understood with reference to the following examples of embodiments of glasses, summarized in Tables A to C. In the attached drawings:

FIG. 1 is the ternary diagram of the $InF_3$-$BaF_2$-$MgF_2$ system mentioned above, FIG. 2 is the diagram of the compound system $InF_3$-$GaF_3$-$GdF_3$ of example 4 below, and FIG. 3 is a diagram showing a spectral loss curve.

EXAMPLE 1

Using 13,45 g of $In_2O_3$, 5.01 g of $ZnF_2$, 6.8 g of $BaF_2$, 6.08 g of $SrF_2$, 0.80 g of $Gd_2O_3$, 0.20 g of NaF and 30 g of $NH_4HF_2$, a glass of the following molecular composition was prepared: 40 $InF_3$, 20 $ZnF_2$, 16 $BaF_2$, 20 $SrF_2$, 2 $GdF_3$, 2 NaF - Reference T01 in Table A below. The powder mixture was prepared First, then heated for five hours at 350° C. to completely fluorinate the oxides. The crucible was then placed in a dry chamber and the temperature gradually increased to the melting point. By pouring at 650° C. into a brass mold preheated to 250° C., it was possible to obtain a parallelepiped sample measuring 60×10×10 mm after grinding and polishing.

EXAMPLE 2

According to a similar method, a series of vitreous samples were prepared having a thickness of more than 10 mm, using the same basic composition but replacing the following:

3% of $NdF_3$ and $PrF_3$ by $SrF_2$ 2 to 12% of $GaF_3$ by $InF_3$ 2 to 5% of $CdF_2$ by $ZnF_2$ 1 to 8% of $PbF_2$ by $SrF_2$ This corresponds to the compositions under the references T02 to T07 in Table A.

EXAMPLE 3

Similarly, thick samples were obtained having the following molecular composition: 36 $InF_3$, 20 $ZnF_2$, 15 $BaF_2$, 20 $SrF_2$, 2 $CaF_2$, 2 $GaF_3$ $PbF_2$, 2$GdF_3$. A comparable sample was synthetized by replacing $CaF_2$ with the same proportion of $LaF_3$.

EXAMPLE 4

The system $InF_3$-$GaF_3$-$ZnF_{b\,2}$-$BaF_2$-$SrF_2$-$GdF3$-NaF was studied. By fixing the concentration at 20% of $ZnF_2$, 16% of $BaF_2$, 20% of $SrF_2$ and 2% of NaF, a pseudoternary $InF_3$, $GaF_3$, $GdF_3$ was defined and is illustrated in FIG. 2.

The zone in which glasses with increased stability are formed is shown by the area bounded by line 3. Line 4 corresponds to the range of compositions at which glasses measuring several millimeters in thickness can be obtained by more rapid cooling.

OTHER EXAMPLES

Samples of glasses based on indium fluoride stabilized by gadolinium fluoride or magnesium fluoride were synthesized to thicknesses greater than 10 mm for various compositions shown in Table B below. This Table B, in which the proportions are expressed as a percentage of molecular point $T_x$, and the maximum temperature of the peak of crystallization weight, also gives the characteristic physical values, such as density, vitreous transition temperature $T_g$, temperature of the crystallization under standard measuring conditions. In comparison to fluoroindate glasses described in the prior art, it is noted that incorporating gadolinium and magnesium fluorides only affects, to a limited degree, the values of the physical constants of the glass, such as density, index, dilatation, $T_g$, with the exception, of course, of the crystallization temperature $T_x$, which is strongly correlated to the stability of the glass.

Using the glass noted under reference T28 in Table B, it was possible to obtain optical fibers having an attenuation of less than 1 dB/m at 5.4 micrometers which only heat up slightly when they transmit a flux emitted by a CO laser. FIG. 3 shows the spectral loss curve of a fiber of this type, between 1 and 5 micrometers. It can be seen that the minimum optical loss is approximately 60 dB/km at about 2.7 micrometers.

Fibers treated with $Nd^{3+}$ and $Pr^{3+}$ ions show the absorption and emission characteristics expected for these rare earths within a fluoride matrix.

They are suitable for laser emission or optical amplification equipment.

Incorporating magnesium in fluoroindate glasses increases their resistance to humidity. The loss of mass of a sample containing 8% of which is subjected to a washing at 90° C. in de-ionized water is, on the average, 25% less than the loss experienced by basic glass in similar conditions. Thus, this provides a possible improvement in the behaviour of optical components made of fluoroindate glasses in humidity.

Table C shows the fluoroindate compositions stabilized by the additions of antimony fluoride and/or thorium fluoride.

TABLE A

| Rel. | InF3 | ZnF2 | BaF2 | SrF2 | GdF3 | GaF3 | NaF | MFn | Density |
|---|---|---|---|---|---|---|---|---|---|
| T01 | 40 | 20 | 16 | 20 | 2 | | 2 | | 4.99 |
| T02 | 40 | 20 | 16 | 20 | 2 | | 2 | 2 CdF2 | 5.03 |
| T03 | 40 | 17 | 16 | 20 | 2 | | 2 | 3 CdF2 | 5.05 |
| T04 | 40 | 15 | 16 | 20 | 2 | | 2 | 5 CdF2 | 5.09 |
| T05 | 40 | 20 | 16 | 18 | 2 | | 2 | 2 PbF2 | 5.07 |
| T06 | 40 | 20 | 16 | 15 | 2 | | 2 | 5 PbF2 | 5.15 |
| T07 | 40 | 20 | 16 | 12 | 2 | | 2 | 8 PbF2 | 5.37 |

TABLE C

| Ref. | InF3 | ZnF2 | BaF2 | SrF2 | GdF3 | GaF3 | M*Fn | MFn | M'Fn | M"Fn | Tg | Index |
|---|---|---|---|---|---|---|---|---|---|---|---|---|
| T39 | 25 | 20 | 27 | | 3 | | | 10 ThF4 | 10 YbF3 | 5 SBF3 | 317 | 1.517 |
| T40 | 25 | 12 | 22 | | 3 | | 13 CdF2 | 10 ThF4 | 10 YbF3 | 5 SbF3 | 302 | 1.526 |
| T41 | 29 | 20 | 28 | | 2 | | | 10 ThF4 | 6 YF3 | 5 SbF3 | 318 | 1.515 |
| T42 | 25 | 15 | 28 | | 2 | | 5 CdF2 | 10 ThF4 | 10 YbF3 | 5 SbF3 | 318 | 1.522 |
| T43 | 25 | 20 | 28 | | 2 | | | 10 ThF4 | 10 YF3 | 5 SbF3 | 328 | 1.515 |
| T44 | 25 | 20 | 22 | | 3 | 5 | | 10 ThF4 | 10 YF3 | 5 SbF3 | 326 | 1.503 |
| T45 | 35 | 20 | 23 | 7.5 | 2 | | | 5 ThF4 | 2.5 CdF2 | | 308 | 1.507 |
| T46 | 18 | 16 | 28 | | 3 | 12 | | 9 ThF4 | 10 YbF3 | 4 MnF2 | 338 | 1.509 |

TABLE B

| Ref. | InF3 | ZnF2 | BaF2 | SrF2 | GdF3 | GaF3 | NaF | MFn | M'Fn | Density | Tg | Tx | Tp |
|---|---|---|---|---|---|---|---|---|---|---|---|---|---|
| T08 | 38 | 20 | 16 | 20 | 2 | 2 | 2 | | | 4.95 | | | |
| T09 | 36 | 20 | 16 | 20 | 2 | 4 | 2 | | | 4.92 | | | |
| T10 | 34 | 20 | 16 | 20 | 2 | 6 | 2 | | | 4.91 | | | |
| T11 | 32 | 20 | 16 | 20 | 2 | 8 | 2 | | | 4.89 | 308 | 412 | 462 |
| T12 | 30 | 20 | 16 | 20 | 2 | 10 | 2 | | | 4.84 | | | |
| T13 | 28 | 20 | 16 | 20 | 2 | 12 | 2 | | | 4.80 | | | |
| T14 | 26 | 20 | 16 | 20 | 2 | 14 | 2 | | | 4.78 | | | |
| T15 | 20 | 20 | 16 | 20 | 2 | 20 | 2 | | | 4.71 | 320 | 430 | 443 |
| T16 | 10 | 20 | 16 | 20 | 2 | 30 | 2 | | | 4.61 | | | |
| T17 | 34 | 10 | 16 | 20 | 2 | 6 | 2 | 10 MnF2 | | 4.84 | 294 | 398 | 425 |
| T18 | 32 | 20 | 15 | 15 | | 6 | | 12 MgF2 | | 4.27 | 310 | 359 | 365 |
| T19 | 34 | 20 | 15 | 18 | 2 | 6 | | 5 MgF2 | | 4.50 | 311 | 436 | 447 |
| T20 | 30 | 20 | 16 | 20 | 7 | 5 | 2 | | | 5.01 | | | |
| T21 | 29 | 31 | 16 | 15 | 2 | 5 | 2 | | | 4.82 | 292 | 362 | 374 |
| T22 | 34 | 19 | 16 | 20 | 2 | 6 | 2 | 1 HfF4 | | 4.92 | 300 | 420 | 463 |
| T23 | 34 | 18 | 16 | 20 | 2 | 6 | 2 | 2 CdF2 | | 4.85 | | | |
| T24 | 33 | 18 | 16 | 20 | 2 | 6 | 2 | 1 CdF2 | | 4.94 | | | |
| T25 | 33 | 20 | 16 | 20 | 2 | 6 | 2 | 1 PbF2 | | 4.93 | | | |
| T26 | 32 | 20 | 14 | 14 | 2 | 6 | 2 | 10 PbF2 | | 5.28 | 284 | 397 | 408 |
| T27 | 34 | 20 | 17 | 20 | 2 | 6 | | 1 LaF3 | | 4.79 | | | |
| T28 | 34 | 20 | 15 | 16 | 2 | 6 | 2 | 5 YF3 | | 4.87 | 298 | 423 | 440 |
| T29 | 34 | 16 | 16 | 16 | 2 | 6 | 5 | 5 ThF4 | | 5.02 | 301 | 411 | 420 |
| T30 | 40 | 20 | 16 | 17 | 2 | | 2 | 3 NdF3 | | | 296 | 398 | 410 |
| T31 | 34 | 20 | 15 | 20 | | 6 | | 5 MgF2 | | | 296 | 406 | 444 |

TABLE B-continued

| Ref. | InF3 | ZnF2 | BaF2 | SrF2 | GdF3 | GaF3 | NaF | MFn | M'Fn | Density | Tg | Tx | Tp |
|---|---|---|---|---|---|---|---|---|---|---|---|---|---|
| T33 | 38 | 20 | 15 | 20 | | 2 | | 3 CaF2 | 2 MgF2 | | 302 | 388 | 398 |
| T34 | 34 | 20 | 15 | 20 | 2 | 6 | 2 | 0.5 YF3 | 0.5 ZrF4 | | 298 | 320 | 460 |
| T35 | 34 | 20 | 15 | 20 | 2 | 6 | 2 | 0.5 CaF2 | 0.5 SnF2 | | 300 | 384 | 392 |
| T36 | 34 | 20 | 15 | 15 | 5 | 6 | | 5 LiF | | | 283 | 414 | 429 |
| T37 | 30 | 20 | 16 | 20 | 7 | 5 | 2 | | | | 309 | 393 | 406 |
| T38 | 34 | 20 | 15 | 20 | | 6 | | 5 MgF2 | | | 310 | 367 | 388 |

We claim:

1. A fluorinated glass composition comprising indium fluoride, zinc fluoride and $MF_2$ fluorides, wherein the sum of indium fluoride, zinc fluoride, and $MF_2$ is at least 70 mole % of the composition, and M is at least one element selected from a group consisting of Ba, Sr, Ca, Pb, the amount of lead fluoride being limited to 1–10 mole %, and at least one stabilizing element from a group consisting of 2–12 mole % of gadolinium fluoride, 2–10 mole % of magnesium fluoride, or a mixture of these two fluorides in a proportion not exceeding 20 mole %.

2. The fluorinated glass composition of claim 1, wherein the fluorinated glass is further stabilized by the addition of at least one fluoride selected from the group consisting of tin fluoride, $SnF_2$, and antimony fluoride, $SbF_3$, in a proportion not exceeding 8 mole %.

3. The fluorinated glass composition of one of claims 1 or 2, wherein the molecular composition of said glass falls within the following parameters expressed as mole %:

2 to 12% of $GdF_3$ 25 to 45% of $InF_3+GaF_3$ 15 to 35% of $ZnF_2+MnF_2$ 25 to 45% of $BaF_2+SrF_2+PbF_2$ 0 to 15% of $CaF_2+CdF_2$ 0 to 15% of $YF_3$ or rare earth fluorides wherein the rare earth is selected from group consisting of Lu, Yb, Er, Ho, Tm, Dy, and Tb 0 to 12% of a fluoride selected from the group consisting of alkali metal fluorides, $LaF_3$, $AlF_3$ $ZrF_4$, $HfF_4$, $ThF_4$ and fluorides of Ce, Pr, Nd, and Sm;

wherein the sum of $InF_2+ZnF_2$ is at least 45%, and the concentration of $GaF_3$ and of $MnF_2$ is in the range of 0–20%.

4. The fluorinated glass composition of one of claims 1 or 2, wherein the molecular composition of said glass falls within the following parameters expressed in mole %:

2 to 10% of $MgF_2$ 25 to 45% of $InF_3+GaF_3$ 15 to 35% of $ZnF_2+MnF_2$ 25 to 45% of $BaF_2+SrF_2+PbF_2$ 0 to 15% of $CaF_2+CdF_2$ 0 to 15% of $YF_3$ or rare earth fluorides, wherein the rare earth is selected from the group consisting of Lu, Yb, Er, Ho, Tm, Dy, and Tb 0 to 12% of a fluoride selected from the group consisting of alkali metal fluorides, $LaF_3$, $AlF_3$ $ZrF_4$, $HfF_4$, $ThF_4$ and fluorides of Ce, Pr, Nd and Sm wherein the sum of $InF_2+ZnF_2$ is at least 45%, and the concentration of $GaF_3$ and of $MnF_2$ is in the range of 0–20%.

5. The fluorinated glass composition of one of claims 1 or 2, wherein the composition contains magnesium fluoride gadolinium fluoride as stabilizing elements in the range of 2 to 20 mole %, the remaining components of the molecular composition falling within the following parameters expressed in mole %:

25 to 45% of $InF_3+GaF_3$ 15 to 35% of $ZnF_2+MnF_2$ 25 to 45% of $BaF_2+SrF_2+PbF_2$ 0 to 15% of $CaF_2+CdF_2$ 0 to 15% of $YF_3$ or rare earth fluorides, wherein the rare earth is selected from the group consisting of Lu, Yb, Er, Ho, Tm, Dy, and Tb 0 to 12% of a fluoride selected from the group consisting of alkali metal fluorides, $LaF_3$, $AlF_3$ $ZrF_4$, $HfF_4$, $ThF_4$ and fluorides Ce, Pr, Nd and Sm;

wherein the sum of $InF_2+ZnF_2$ is at least 45%, and the concentration of $GaF_3$ and of $MnF_2$ is in the range of 0–20 mole%.

6. The fluorinated glass composition of one of claims 1 or 2, wherein the molecular composition of said glass falls within the following parameters expressed in mole %:

2 to 6% of $GdF_3$ 38 to 42% of $InF_3+GaF_3$ 15 to 25% of $SrF_2+PbF_2+CaF_2$ 15 to 25% of $BaF_2+CdF_2+LaF_3$ 18 to 22% of $ZnF_2+MnF_2$ 0 to 8% of alkali metal fluorides, rare earth fluorides, wherein the rare earth is selected from the group consisting of yttrium, Lu, Yb, Er, Ho, Tm, Dy, and Tb or $M'F_4$ fluorides, wherein M' is Zr, Hf or Th.

7. The fluorinated glass composition according to one of claims 1 or 2, wherein indium is partially replaced by gallium, or zinc is partially replaced by manganese, in a proportion not exceeding 20 mole %, these substitutions being possible independent of one another or in association with one another.

* * * * *